United States Patent
Hsieh et al.

(10) Patent No.: US 10,985,862 B2
(45) Date of Patent: Apr. 20, 2021

(54) WIRELESS COMMUNICATING METHOD AND ASSOCIATED ELECTRONIC DEVICE

(71) Applicant: MEDIATEK INC., Hsin-Chu (TW)

(72) Inventors: Hung-Tao Hsieh, Hsinchu County (TW); Tung Sheng Yang, Taichung (TW); Hsuan-Yu Liu, Hsinchu County (TW); Kun-Chien Hung, Hsinchu County (TW); YungPing Hsu, Taipei (TW); Jianhan Liu, San Jose, CA (US); Shengquan Hu, Cupertino, CA (US); Chih-Shi Yee, Hsinchu (TW); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/684,921

(22) Filed: Aug. 23, 2017

(65) Prior Publication Data

US 2018/0062787 A1 Mar. 1, 2018

Related U.S. Application Data

(60) Provisional application No. 62/381,043, filed on Aug. 30, 2016.

(51) Int. Cl.
*H04L 1/00* (2006.01)
*H04W 52/04* (2009.01)
(Continued)

(52) U.S. Cl.
CPC .......... *H04L 1/0003* (2013.01); *H04L 1/0002* (2013.01); *H04L 1/004* (2013.01); *H04L 1/0009* (2013.01); *H04L 1/0023* (2013.01); *H04L 5/006* (2013.01); *H04L 5/0042* (2013.01); *H04W 52/04* (2013.01); *H04W 72/04* (2013.01); *H04L 5/0044* (2013.01); *H04W 72/0453* (2013.01)

(58) Field of Classification Search
CPC .......................... H04L 27/2613; H04W 72/042
See application file for complete search history.

(56) References Cited

U.S. PATENT DOCUMENTS 8,077,793 B2    12/2011  Khan
9,509,367 B2 *  11/2016  Nair ..................... H04B 1/7097
(Continued)

FOREIGN PATENT DOCUMENTS

EP        2 252 002 A2     11/2010
WO   WO 2017209670 A1 *  12/2017  .............. H04W 4/00

OTHER PUBLICATIONS

Kome Oteri et al., Multiple Resource Unit Allocation for TGax OFDMA, doc.: IEEE 802.11-15/1057r0, Sep. 12, 2015, XP068098254, Slides 1-24.

(Continued)

*Primary Examiner* — Parth Patel
*Assistant Examiner* — Berhanu D Belete
(74) *Attorney, Agent, or Firm* — Winston Hsu

(57) ABSTRACT

A wireless communicating method includes: performing one resource unit allocation upon a channel; and allocating a first resource unit and a second resource unit in said one resource unit allocation to a station, wherein the first resource unit is different from the second resource unit. By using the wireless communication method, throughput rate can be improved.

16 Claims, 5 Drawing Sheets

(51) Int. Cl.
*H04L 5/00* (2006.01)
*H04W 72/04* (2009.01)

(56) References Cited

U.S. PATENT DOCUMENTS

| | | | | |
|---|---|---|---|---|
| 9,532,187 | B2* | 12/2016 | Seok | H04L 69/324 |
| 9,924,525 | B2* | 3/2018 | Sadiq | H04L 1/0026 |
| 2008/0207119 | A1* | 8/2008 | Chang | H04L 27/0008 |
| | | | | 455/17 |
| 2010/0027496 | A1* | 2/2010 | Higuchi | H04B 7/0632 |
| | | | | 370/329 |
| 2010/0166090 | A1* | 7/2010 | Ho | H04L 5/0023 |
| | | | | 375/260 |
| 2010/0177717 | A1* | 7/2010 | Sung | H04W 72/042 |
| | | | | 370/329 |
| 2011/0051631 | A1* | 3/2011 | Niemela | H04L 27/3416 |
| | | | | 370/280 |
| 2011/0110312 | A1* | 5/2011 | Zhao | H04W 72/1257 |
| | | | | 370/329 |
| 2011/0274068 | A1* | 11/2011 | Lee | H04L 1/0017 |
| | | | | 370/329 |
| 2012/0327896 | A1* | 12/2012 | Lee | H04W 72/044 |
| | | | | 370/330 |
| 2013/0150113 | A1* | 6/2013 | Alamshahi | H04W 52/40 |
| | | | | 455/517 |
| 2013/0176864 | A1* | 7/2013 | Quan | H04L 1/0002 |
| | | | | 370/245 |
| 2013/0229943 | A1* | 9/2013 | Huang | H04B 17/391 |
| | | | | 370/252 |
| 2013/0286959 | A1 | 10/2013 | Lou | |
| 2015/0201386 | A1* | 7/2015 | Kimura | H04W 52/245 |
| | | | | 455/522 |
| 2016/0044635 | A1* | 2/2016 | Seok | H04L 69/22 |
| | | | | 370/312 |
| 2016/0142158 | A1* | 5/2016 | Li | H04B 7/0452 |
| | | | | 455/63.1 |
| 2016/0204912 | A1* | 7/2016 | Sun | H04L 1/0042 |
| | | | | 375/302 |
| 2016/0226638 | A1* | 8/2016 | Azizi | H04L 5/0048 |
| 2016/0249303 | A1* | 8/2016 | Kenney | H04W 52/245 |
| 2016/0255610 | A1 | 9/2016 | Li | |
| 2016/0262139 | A1* | 9/2016 | Porat | H04W 72/044 |
| 2016/0330058 | A1* | 11/2016 | Chen | H04L 27/2607 |
| 2016/0330715 | A1* | 11/2016 | Chen | H04L 27/2607 |
| 2016/0330742 | A1* | 11/2016 | Li | H04B 7/0452 |
| 2017/0006608 | A1* | 1/2017 | Josiam | H04L 5/0023 |
| 2017/0048862 | A1* | 2/2017 | Choi | H04L 5/0053 |
| 2017/0070961 | A1* | 3/2017 | Bharadwaj | H04L 1/0009 |
| 2017/0126453 | A1* | 5/2017 | Montreuil | H04L 27/2613 |
| 2017/0181164 | A1* | 6/2017 | Tandai | H04W 84/12 |
| 2017/0238232 | A1* | 8/2017 | Yang | H04W 40/02 |
| | | | | 370/328 |
| 2017/0264354 | A1* | 9/2017 | Ghosh | H04B 7/0452 |
| 2017/0265135 | A1* | 9/2017 | Cariou | H04W 52/0219 |
| 2017/0303276 | A1* | 10/2017 | Cheng | H04B 17/309 |
| 2018/0035299 | A1* | 2/2018 | Feng | H04W 72/1273 |
| 2019/0357149 | A1* | 11/2019 | Zhang | H04W 72/14 |

OTHER PUBLICATIONS

Joonsuk Kim et al., HE-SIG-B Structure, doc.: IEEE 802.11-15/0821r2, Jul. 11 2015, XP068119963, Slides 1-19.

* cited by examiner

WIRELESS COMMUNICATING METHOD AND ASSOCIATED ELECTRONIC DEVICE

CROSS REFERENCE TO RELATED APPLICATIONS

This application claims the benefit of U.S. Provisional Application No. 62/381,043, which was filed on Aug. 30, 2016, and is incorporated herein by reference.

BACKGROUND

IEEE 802.11 is a media access control (MAC) and physical layer (PHY) specification for implementing wireless local area network (WLAN) communication in frequency bands (such as 2.4, 3.6, 5, and 60 GHz). This standard provides the basis for wireless network products using the Wi-Fi frequency bands. For example, IEEE 802.11ac is a wireless networking standard in the 802.11 family, providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within the IEEE 802.11 working group for considering improvements in spectrum efficiency to enhance system throughput in high-density scenarios of wireless devices. TGax was formed in response to HEW SG, and tasked to work on the IEEE 802.11ax standard, which will become a successor to IEEE 802.11ac.

IEEE 802.11ax seeks throughput enhancement in the dense deployed environment. Specifically, uplink (UL) and downlink (DL) user aggregation has been introduced to increase network efficiency. Transmission by UL Orthogonal Frequency Division Multiple Access (OFDMA) for non-access point (AP) stations can alleviate collision, and also enhance performance such as throughput rate and latency. Concerning the single-user (SU) OFDMA application, the Modulation and Coding Scheme (MCS) used by said single-user (station) for communication with an access point (AP) in a channel is dominated by the worst signal-to-noise ratio (SNR) in the frequency domain which greatly affects the communication quality. A novel design for the station communicating with the AP by using different MCS is desired.

SUMMARY

One of the objectives of the present invention is to provide a wireless communicating method and an associated electronic device to solve the abovementioned problem.

According to an embodiment of the present invention, a wireless communicating method is disclosed, comprising: performing one resource unit (RU) allocation upon a channel; and allocating a first RU and a second RU in said one RU allocation to a station, wherein the first RU is different from the second RU.

According to an embodiment of the present invention, a wireless communicating method is disclosed, comprising: utilizing a first stream in a resource unit (RU) with a first Modulation and Coding Scheme (MCS) for a station communicating in a channel; and utilizing a second stream in the RU with a second MCS for the station communicating in the channel, wherein the second stream is different from the first stream, and the second MCS is different from the first MCS.

According to an embodiment of the present invention, an electronic device is disclosed, comprising: a storage device, arranged to store a program code; and a processor, arranged to execute the program code; wherein when loaded and executed by the processor, the program code instructs the processor to execute the following steps: performing one resource unit (RU) allocation upon a channel; and allocating a first RU and a second RU in said one RU allocation to a station, wherein the first RU is different from the second RU.

According to an embodiment of the present invention, an electronic device is disclosed, comprising: a storage device, arranged to store a program code; and a processor, arranged to execute the program code; wherein when loaded and executed by the processor, the program code instructs the processor to execute the following steps: utilizing a first stream in a resource unit (RU) with a first Modulation and Coding Scheme (MCS) for a station communicating in a channel; and utilizing a second stream in the RU with a second MCS for the station communicating in the channel, wherein the second stream is different from the first stream, and the second MCS is different from the first MCS.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
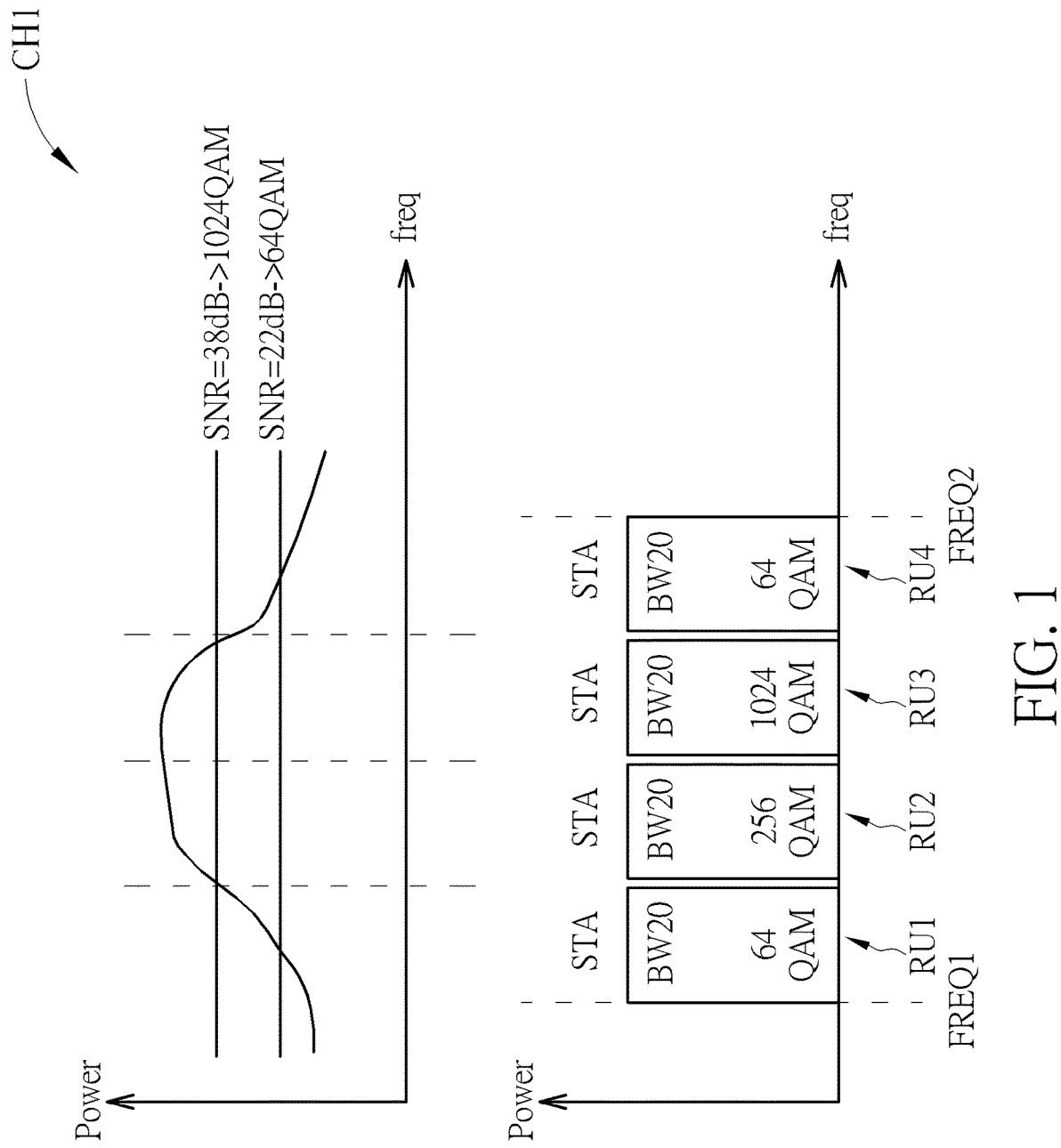
FIG. 1 is a diagram illustrating a wireless communicating method performed upon a channel according to a first embodiment of the present invention.

FIG. 1 is a diagram illustrating a wireless communicating method performed upon a channel CH1 according to a first embodiment of the present invention. The channel CH1 occupies a frequency band from a frequency FREQ1 to a frequency FREQ2. The frequency band is equally divided into four sub-bands for resource units RU1, RU2, RU3, and RU4, all having the same band width BW, for stations to communicate with an access point (AP) (not shown in FIG. 1). It should be noted that the width of the frequency band composed of the frequencies FREQ1 and FREQ2 is not a limitation of the present invention. The number of RUs comprised in the frequency band shown in FIG. 1 is only for illustrative purposes and can be adjusted according to the width of the frequency band in the actual application. From previous communication between the AP and the stations, the AP learns the condition of the channel CH. The condition of the channel CH is depicted in the upper part of FIG. 1. As seen in FIG. 1, the condition, e.g. the signal-to-noise (SNR), of the channel CH1 in the lower frequency band and the higher frequency band (in which the SNR is roughly 22 dB) is poor, while the condition of the middle part of the frequency band (in which the SNR is roughly 38 dB) is better. Traditionally, for the single-user (SU) Orthogonal Frequency Division Multiple Access (OFDMA) application, the Modulation and Coding Scheme (MCS) for a station STA is dominated by the worst SNR of the channel CH1; for example, the MCS for the station STA communicating with the AP utilizes 64 Quadrature Amplitude Modulation (QAM) as the worst SNR for the channel CH is roughly 22 dB. The wireless communicating method provided by the present invention performs a resource unit allocation to allocate the RUs RU1, RU2, RU3, and RU4 to the station STA, wherein the MCS used by each of the RUs RU1, RU2, RU3, and RU4 is based on the condition of the channel CH. For example, the RU RU1 uses 64 QAM, the RU RU2 uses 256 QAM, the RU RU3 uses 1024 QAM, and the RU RU4 uses 64 QAM, as shown in FIG. 1. The abovementioned example is applicable for the SU OFDMA application; however, it is not a limitation of the present invention. For multi-user (MU) OFDMA application, the wireless communicating method provided by the present invention performs the RU allocation to allocate the RUs RU1, RU2, RU3, and RU4 to multiple stations. For example, the RUs RU1 and RU2 are allocated to a station, the RU RU3 are allocated to another station, and the RU RU4 is allocated to yet another station for communication, wherein the MCS used by each of the RUs RU1, RU2, RU3, and RU4 is based on the condition of the channel CH.

Figure 2:
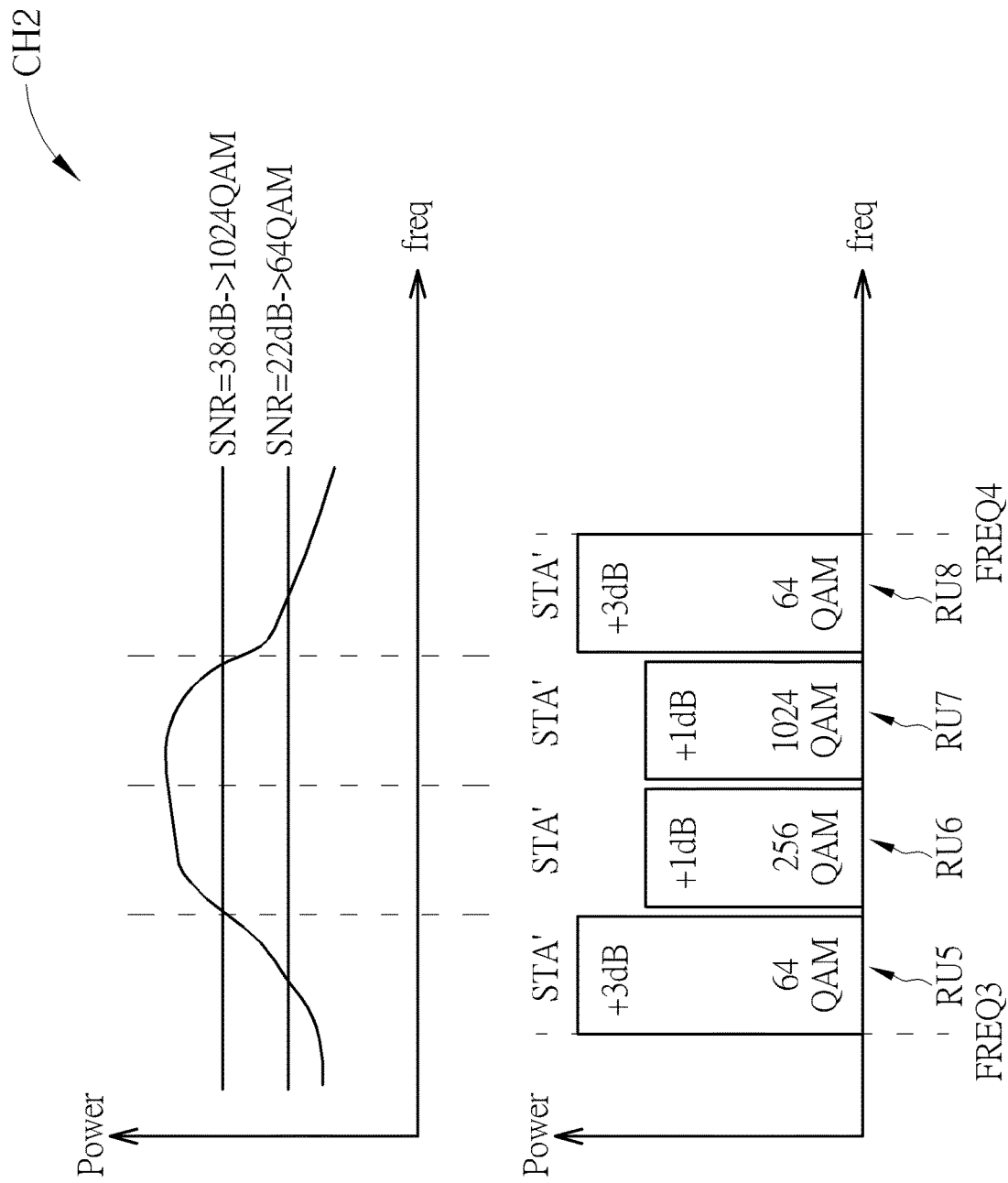
FIG. 2 is a diagram illustrating a wireless communicating method performed upon a channel according to a second embodiment of the present invention.

FIG. 2 is a diagram illustrating a wireless communicating method performed upon a channel CH2 according to a second embodiment of the present invention. The channel CH2 occupies a frequency band from a frequency FREQ3 to a frequency FREQ4. The frequency band is equally divided into four sub-bands for resource units RU5, RU6, RU7, and RU8 in order for stations to communicate with an access point (AP) (not shown in FIG. 2). It should be noted that the width of the frequency band composed of the frequencies FREQ3 and FREQ4 is not a limitation of the present invention. The number of RUs in the frequency band shown in FIG. 2 is only for illustrative purposes and can be adjusted according to the width of the frequency band in the actual application. From previous communication between the AP and the stations, the AP learns the condition of the channel CH. The condition of the channel CH is depicted in the upper part of FIG. 2. As seen in FIG. 2, the condition, e.g. the signal-to-noise (SNR), of the channel CH2 in the lower frequency band and the higher frequency band (in which the SNR is roughly 22 dB) is poor, while the condition of the middle part of the frequency band (in which the SNR is roughly 38 dB) is better. To enhance the communication quality, the AP can adjust a transmission power in response to the SNR of the sub-band for communicating with the RUs RU5, RU6, RU7 and RU8. For example, the AP uses higher transmission power (e.g. +3 dB as shown in FIG. 2) for communicating in the RUs RU1 and RU4 while using lower transmission power (e.g. 1 dB as shown in FIG. 2) to communicate with the RUs RU2 and RU3. As shown in FIG. 2, all the RUs RU5, RU6, RU7, and RU8 are allocated to a station STA' for communicating with the AP; i.e. for SU OFDMA application. As described in the embodiment of FIG. 1, the wireless communicating method of embodiment of FIG. 2 can also be applied to MU OFDMA application. For example, the RUs RU5 and RU7 are allocated to a station, the RU RU6 is allocated to another station, and the RU RU8 is allocated to yet another station. The MCS used by each of the RUs RU5, RU6, RU7, and RU8 is based on the condition of the channel CH2, as described in the embodiment of FIG. 1. It should be noted that the transmission power regarding each of the RUs RU5, RU6, RU7, and RU8 in this embodiment is only for illustrative purposes, and not a limitation of the present invention.

Figure 3:
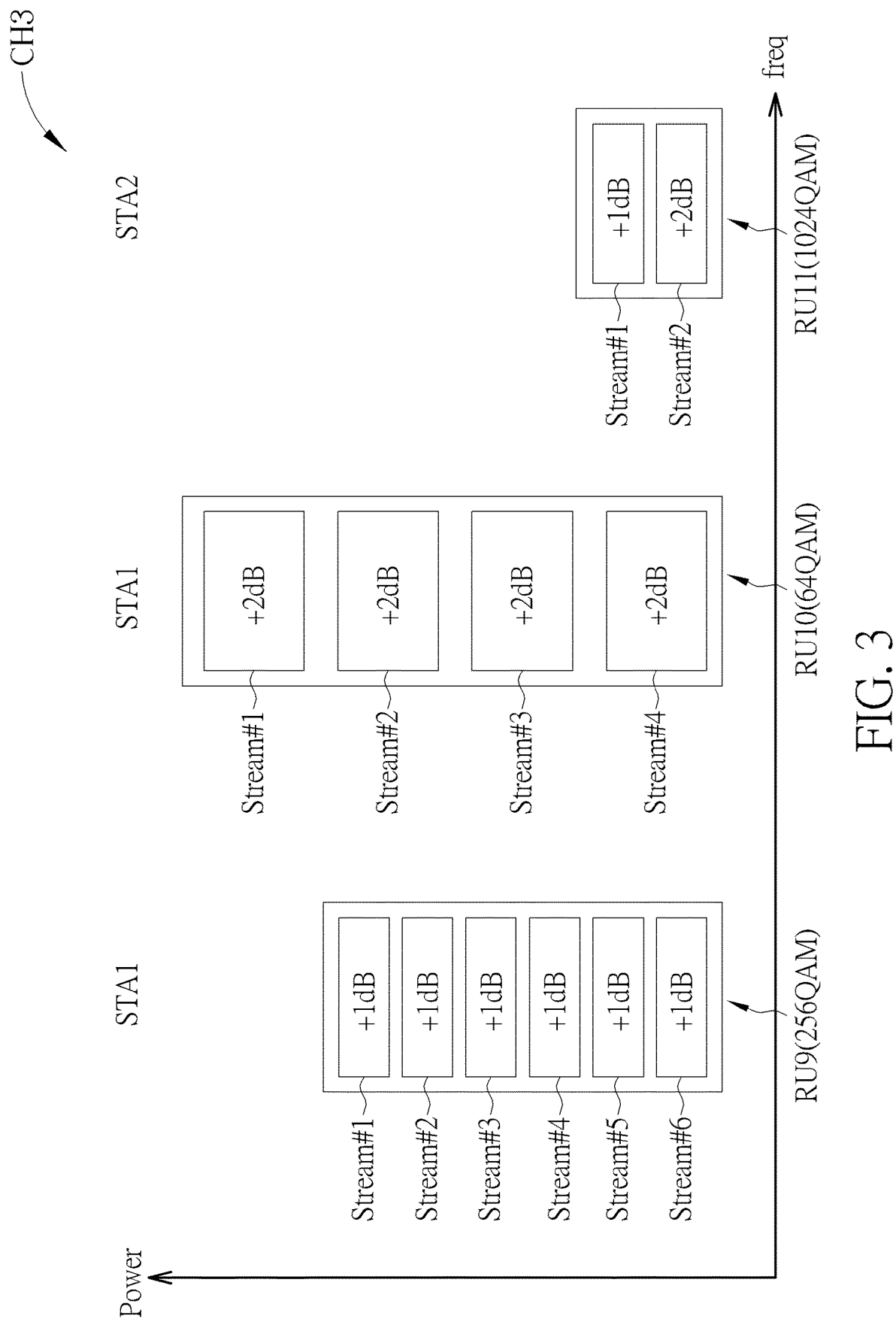
FIG. 3 is a diagram illustrating a wireless communicating method performed upon a channel according to a third embodiment of the present invention.

FIG. 3 is a diagram illustrating a wireless communicating method performed upon a channel CH3 according to a third embodiment of the present invention. The channel CH3 occupies a frequency band from a frequency FREQ5 to a frequency FREQ6. The frequency band is equally divided into three sub-bands for resource units RU9, RU10, and RU11 in order for stations to communicate with an access point (AP) (not shown in FIG. 3). It should be noted that the width of the frequency band composed of the frequencies FREQ5 and FREQ6 is not a limitation of the present invention. The number of the RUs in the frequency band shown in FIG. 3 is only for illustrative purposes and can be adjusted according to the width of the frequency band in the actual application. As shown in FIG. 3, the RUs RU9, and RU10 are allocated to a station STA1, and the RU RU11 is allocated to a station STA2 for MU OFDMA application. As described in the embodiment of FIG. 1, the wireless communicating method of embodiment of FIG. 3 can also be applied to SU OFDMA application. For example, all the RUs RU9, RU10 and RU11 are allocated to either the station STA1 or the station STA2. Each of the RUs RU9, RU10, and RU11 upon the channel CH3 may comprise a different number of streams for communication, but this is not a limitation of the present invention. For example, as shown in FIG. 3, the RU RU9 comprises six streams therein, the RU RU10 comprises 4 streams therein, and the RU RU11 comprises 2 streams for communication. Via a different stream, the AP can communicate with the station (i.e. the STA1 or the STA2) with a different transmission power. More specifically, the AP communicates with the station STA1 in the RU RU9, wherein each of the six streams in the RU RU9 is used with transmission power +1 dB. The AP communicates with the station STA1 in the RU RU10, wherein each of the four streams in the RU RU9 is used with transmission power +2 dB. The AP communicates with the station STA2 in the RU RU11, wherein the first stream in the RU RU11 is used with transmission power +1 dB while the second stream in the RU RU11 is used with transmission power +2 dB. As mentioned in the embodiments of FIG. 1 and FIG. 2, the MCS used by each of the RUs RU9, RU10, and RU11 is based on the condition of the channel CH3. For example, the MCS of the RU RU9 uses 256 QAM, the MCS of the RU RU10 uses 64 QAM, and the MCS of the RU RU11 uses 1024 QAM. This is only for illustrative purposes, however, and not a limitation of the present invention.

Regarding the wireless communicating method of the embodiments shown in FIG. 1, FIG. 2 and FIG. 3, each RU may use a different coding scheme, i.e. a different Low-Density Parity Check (LDPC) or Binary Convolutional Code (BBC). Likewise, each RU may use a different cyclic redundancy check (CRC) or rate adaptation for communication. In addition, in a case where a station utilizes more than one RU to communicate with the AP, e.g. the station STA1 in the embodiment of FIG. 3, the station STA1 may use the same or a different coding rate for the RUs RU9 and RU10. For example, when the RUs RU9 and RU10 utilize different MCSs (i.e. 64 QAM and 256 QAM as shown in FIG. 3), the station STA1 can use the same coding rate to communicate with the AP to reduce the transmitter/receiver complexity. When the RUs RU9 and RU10 utilize the same MCS, the station STAT can use a different coding rate for each RU to communicate with the AP.

Figure 4:
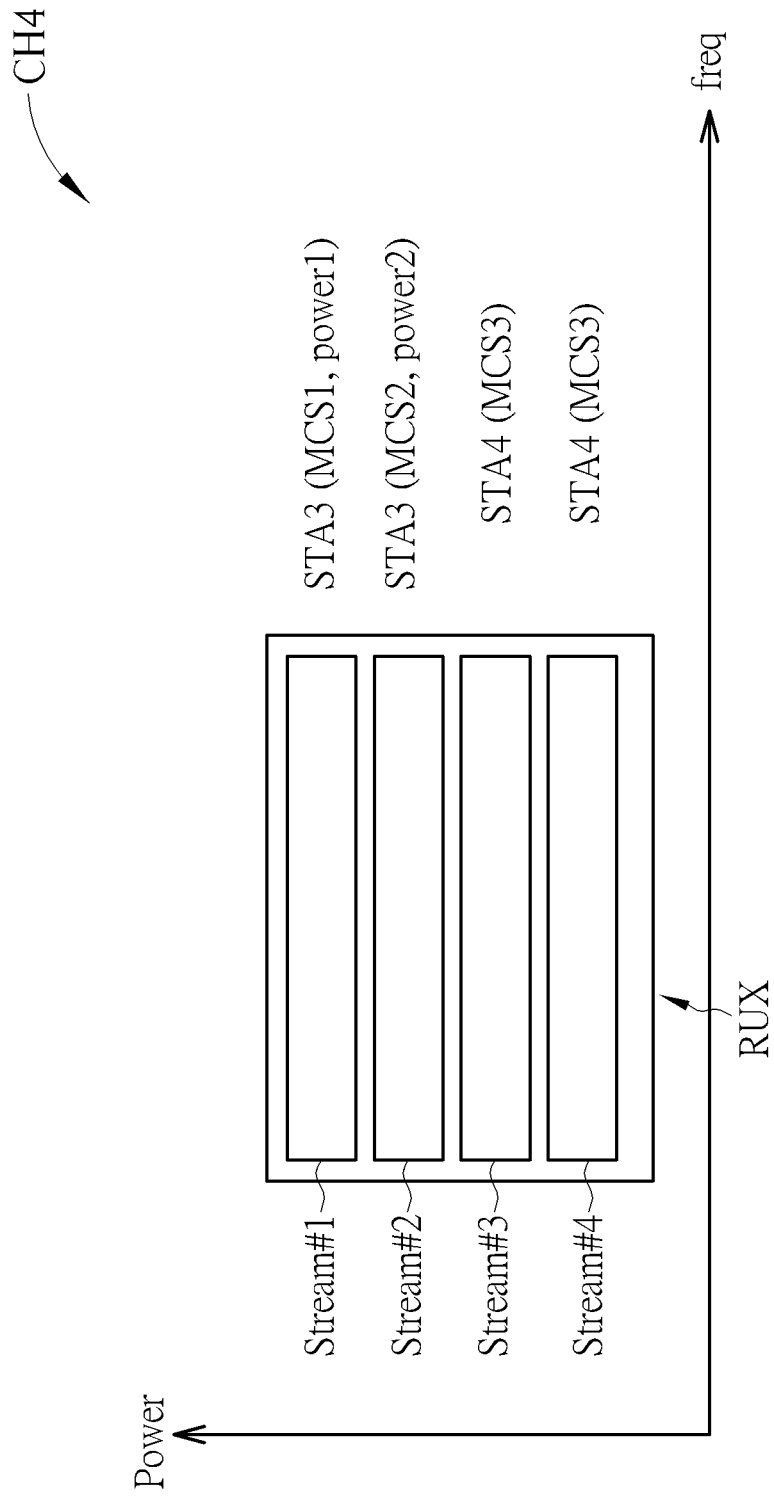
FIG. 4 is a diagram illustrating a wireless communicating method performed upon a channel according to a fourth embodiment of the present invention.

FIG. 4 is a diagram illustrating a wireless communicating method performed upon a channel CH4 according to a fourth embodiment of the present invention. As shown in FIG. 4, a frequency band occupied by the channel CH4 comprises only one RU RUX comprising four streams for communication. It should be noted that the number of the streams comprised in the RU RUX is only for illustrative purposes, and not a limitation of the present invention. When there is only one RU (i.e. RUX) upon the channel, the streams in the RU RUX are allowed to be allocated to multiple stations for communication. For example, the first stream and the second stream are allocated to a station STA3, and the third stream and the fourth stream are allocated to a station STA4. Traditionally, the streams allocated to the same station must use the same MCS. In this embodiment, however, the streams allocated to the same station may use a different MCS. For example, the first stream uses the MCS MCS1 while the second stream uses the MCS MCS2, and both the first stream and second stream are allocated to the station STA3. As mentioned in the embodiment of FIG. 3, via a different stream, the AP can communicate with the station (i.e. the STA3 or the STA4) with a different transmission power. For example, as shown in FIG. 4, the AP uses different transmission powers (i.e. power1 and power2) to communicate with the station STA3 in the first stream and the second stream, respectively.

Regarding the wireless communicating methods of the embodiments of FIG. 1-FIG. 4, information indicating the RU allocation (or the stream allocation) and the transmission power can be carried in a trigger frame or a high efficiency (HE) multi-user (MU) packet either for the uplink (UL) or downlink (DL) OFDMA application.

Figure 5:
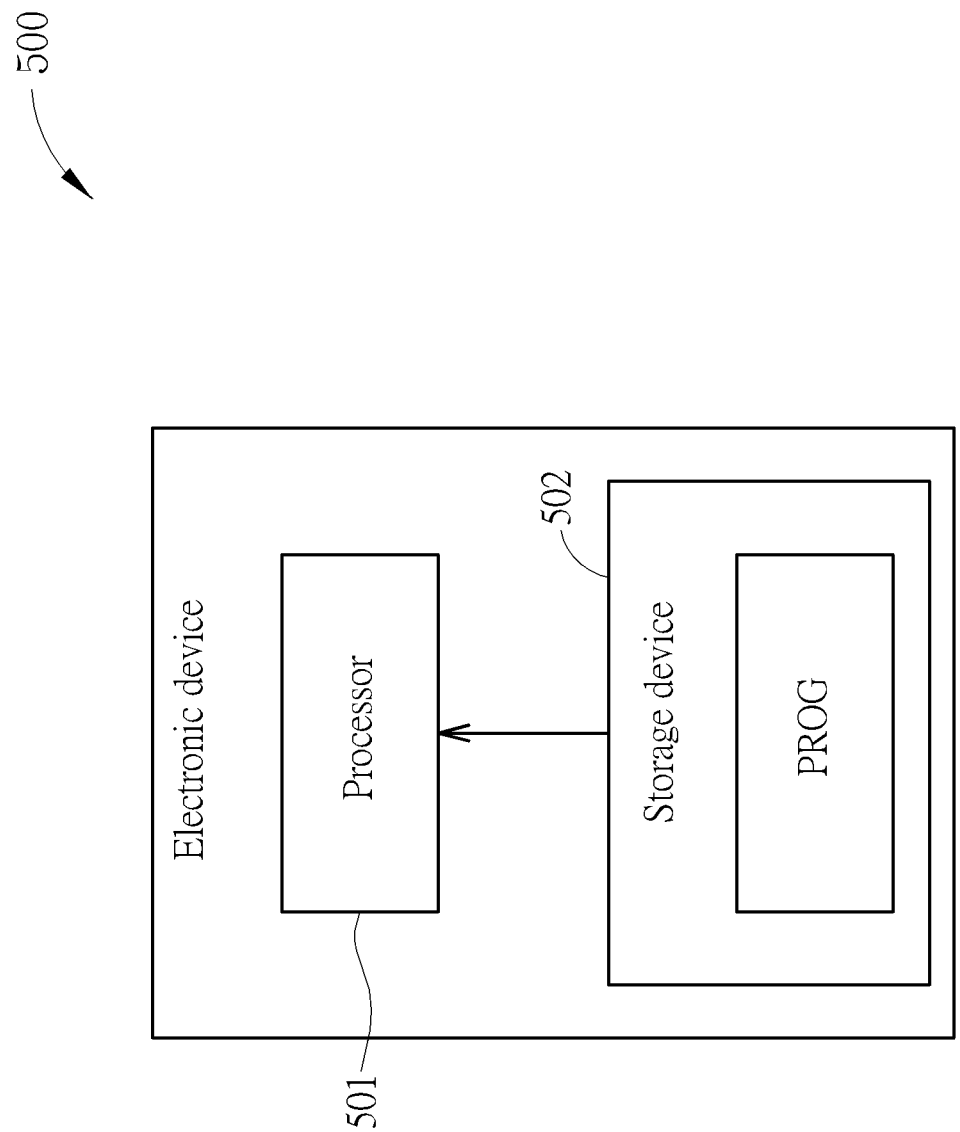
FIG. 5 is a diagram illustrating an electronic device for performing the wireless communicating method according to an embodiment of the present invention.

FIG. 5 is a diagram illustrating an electronic device 500 for performing the aforementioned wireless communicating method according to an embodiment of the present invention. The electronic device 500 comprises a processor 501, and a storage device 502 storing a program code PROG. When the program code PROG is loaded and executed by the processor 501, the wireless communicating methods of the embodiments of FIG. 1-FIG. 4 will be executed. One skilled in the art should readily understand the operation of the processor 501 after reading the above paragraphs. The detailed description is therefore omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communicating method, comprising:
   allocating a first resource unit (RU) and a second RU in a channel, wherein the first RU occupies a first sub-band in a frequency band occupied by the channel while the second RU occupies a second sub-band in the frequency band occupied by the channel, and the first sub-band is different from the second sub-band;
   determining a channel condition of the channel;
   according to the determined channel condition, assigning a first modulation and coding scheme (MCS) and a first transmission power to the first RU and assigning a second MCS and a second transmission power to the second RU; and
   after the one RU allocation, communicating with a single station using the first RU and the second RU;
   wherein the first MCS is different from the second MCS and/or the first transmission power is different from the second transmission power, such that a Signal-to-Noise Ratio (SNR) of the first RU is the same as an SNR of the second RU.

2. The wireless communicating method of claim 1, further comprising:
   utilizing a first cyclic redundancy check (CRC) for the station communicating in the first RU; and
   utilizing a second CRC for the station communicating in the second RU, wherein the second CRC is different from the first CRC.

3. The wireless communicating method of claim 1, further comprising:
   encoding a first data with a specific coding rate for communicating in the first RU; and
   encoding a second data with the specific coding rate for communicating in the second RU.

4. The wireless communicating method of claim 1, further comprising:
   encoding a first data with a first coding rate for communicating in the first RU; and
   encoding a second data with a second coding rate for communicating in the second RU, wherein the second coding rate is different from the first coding rate.

5. The wireless communicating method of claim 1, wherein the first RU comprises a plurality of streams and the second RU comprises a plurality of streams, and the method further comprises:
   utilizing a first number of streams of the first RU for the station to communicate; and
   utilizing a second number of streams of the second RU for the station to communicate, wherein the second number of streams of the second RU is different from the first number of streams of the first RU.

6. The wireless communicating method of claim 1, further comprising:
   utilizing a first rate adaptation for the station communicating in the first RU; and
   utilizing a second rate adaptation for the station communicating in the second RU, wherein the second rate adaptation is different from the first rate adaptation.

7. The wireless communicating method of claim 1, wherein information indicating the one RU allocation is carried in a trigger frame or a high efficiency (HE) multi-user (MU) packet.

8. A wireless communicating method, comprising:
   for a station communicating in a channel, determining a channel condition of the channel;
   utilizing a first stream in a resource unit (RU) for the station and assigning the first stream in the RU with a first Modulation and Coding Scheme (MCS); and
   utilizing a second stream in the RU for the station and assigning the second stream in the RU with a second MCS, wherein the second stream is different from the first stream, and the second MCS is different from the first MCS, and the first MCS and the second MCS are assigned according to the determined channel condition to compensate for any change in Signal-to-Noise Ratio (SNR) within the channel.

9. The wireless communicating method of claim 8, further comprising:
communicating with the station in the first stream with a first transmission power; and
communicating with the station in the second stream with a second transmission power, wherein the second transmission power is different from the first transmission power.

10. The wireless communicating method of claim 8, further comprising:
utilizing a first cyclic redundancy check (CRC) for the station communicating in the first stream; and
utilizing a second CRC for the station communicating in the second stream, wherein the second CRC is different from the first CRC.

11. An electronic device, comprising:
a storage device, arranged to store a program code; and
a processor, arranged to execute the program code;
wherein when loaded and executed by the processor, the program code
instructs the processor to execute the following steps:
allocating a first resource unit (RU) and a second RU in a channel, wherein the first RU occupies a first sub-band in a frequency band occupied by the channel while the second RU occupies a second sub-band in the frequency band occupied by the channel, and the first sub-band is different from the second sub-band;
determining a channel condition of the channel;
according to the determined channel condition, assigning a first modulation and coding scheme (MCS) and a first transmission power to the first RU and assigning a second MCS and a second transmission power to the second RU; and
after the one RU allocation, communicating with a single station using the first RU and the second RU;
wherein the first MCS is different from the second MCS and/or the first transmission power is different from the second transmission power, such that a Signal-to-Noise Ratio (SNR) of the first RU is the same as an SNR of the second RU.

12. The electronic device of claim 11, wherein the program code instructs the processor to further execute the following steps:
encoding a first data with a specific coding rate for communicating in the first RU; and
encoding a second data with the specific coding rate for communicating in the second RU.

13. The electronic device of claim 11, wherein the program code instructs the processor to further execute the following steps:
encoding a first data with a first coding rate for communicating in the first RU; and
encoding a second data with a second coding rate for communicating in the second RU, wherein the second coding rate is different from the first coding rate.

14. The electronic device of claim 11, wherein the first RU comprises a plurality of streams and the second RU comprises a plurality of streams, and the program code instructs the processor to further execute the following steps:
utilizing a first number of streams of the first RU for the station to communicate; and
utilizing a second number of streams of the second RU for the station to communicate, wherein the second number of streams of the second RU is different from the first number of streams of the first RU.

15. An electronic device, comprising:
a storage device, arranged to store a program code; and
a processor, arranged to execute the program code;
wherein when loaded and executed by the processor, the program code
instructs the processor to execute the following steps:
for a station communicating in a channel, determining a channel condition of the channel;
utilizing a first stream in a resource unit (RU) for the station and assigning the first stream in the RU with a first Modulation and Coding Scheme (MCS); and
utilizing a second stream in the RU for the station, wherein the second stream is different from the first stream, and the second MCS is different from the first MCS, and the first MCS and the second MCS are assigned according to the determined channel condition to compensate for any change in Signal-to-Noise Ratio (SNR) within the channel.

16. The electronic device of claim 15, wherein the program code instructs the processor to further execute the following steps:
communicating with the station in the first stream with a first transmission power; and
communicating with the station in the second stream with a second transmission power, wherein the second transmission power is different from the first transmission power.

* * * * *